United States Patent [19]

Webb et al.

[11] 4,385,830
[45] May 31, 1983

[54] DIRECT MEASUREMENT OF VORTICITY BY OPTICAL PROBE

[75] Inventors: Watt W. Webb; Michael B. Frish, both of Ithaca, N.Y.

[73] Assignee: Cornell Research Foundation, Inc., Ithaca, N.Y.

[21] Appl. No.: 210,704

[22] Filed: Nov. 26, 1980

[51] Int. Cl.[3] .............................................. G01P 3/36
[52] U.S. Cl. ........................................ 356/28; 350/105; 356/338; 356/342; 356/343; 523/172
[58] Field of Search ........................ 526/221; 523/172; 524/783, 424; 356/337, 338, 342, 343, 36, 28, 28.5; 350/104, 105, 106; 250/231 SE

[56] References Cited

U.S. PATENT DOCUMENTS

| | | | |
|---|---|---|---|
| 1,516,608 | 11/1924 | Kidde et al. | 356/337 |
| 1,807,659 | 6/1931 | Grant, Jr. | 356/337 |
| 2,866,935 | 12/1958 | Robillard | 356/28 |
| 3,145,114 | 8/1964 | Rindone | 106/47 |
| 3,171,827 | 3/1965 | De Vries et al. | 523/172 |
| 3,245,307 | 4/1966 | Lang | 350/105 |
| 3,428,514 | 2/1969 | Greer et al. | 523/172 |
| 3,787,874 | 1/1974 | Urban | 346/1 |
| 3,941,477 | 3/1976 | Schodl | 356/28 |
| 4,206,999 | 6/1980 | Keller | 356/28 |

OTHER PUBLICATIONS

Y. Loh et al., J. Phys. E: Sci. Instrum., vol. 14, No. 8, Aug. 1981, pp. 981, 356-428
"Measurement of the Rate of Strain Tensor in a Tubulent Liquid Using Light Scattered from Asymmetric Particles", W. W. Webb, D. H. Johnson, *Bulletin of American Physical Society*, 1972.
"Direct Optical Measurement of Vorticity", M. B. Frish and W. W. Webb, *Bulletin of the American Physical Society*, Oct. 1979.
*Experimental Plastics: A Practical Course for Students*, Redfarn and Bedford, Interscience, 1960.
"Vorticity and Turbulence Production in Pattern Recognized Turbulent Flow Structure", *Physics of Fluids*, 20, H. Eckelmann, S. C. Nychas; R. S. Brodkey, J. M. Wallace, 1972.
"Survey and New Measurements of Turbulent Structure Near the Wall", *Physics of Fluids*, 20, W. W. Willmarth and T. J. Bogar, 1977.
"Grid Turbulence in Air and Water", *Physics of Fluids*, 22, F. N. Frenkiel; P. S. Klebanoff and T. T. Huang, 1979.
"The Motion of Ellipsoidal Particles Immersed in a Viscous Fluid", *Proc. Roy, Soc. A 102*, G. B. Jeffrey, 1922.
"Hydromechanics of Low-Reynolds-Number Flow, Part 1: Rotation of Axisymmetric Prolate Bodies", *J. Fluid Mech.* 63, A Chwang and T. Wu.
"Contribution to Suspension Polymerization", *Makromolekulare Chemie*, 78, H. Hopff; H. Lussi; P. Gerspacher, 1964.
"The Vorcom, Part 2: Demonstration Vorticity Measurements", *Third Annual Report*, NASA, Langley Research Center, J. F. Floss, 1977.

*Primary Examiner*—S. C. Buczinski
*Attorney, Agent, or Firm*—Jones, Tullar & Cooper

[57] ABSTRACT

An optical system for direct measurement of vorticity in a flowing fluid is disclosed. Spherical particles suspended in the flow rotate with an angular velocity that is accurately equal to half the local vorticity; thus, measurements of the rotation rates of such particles indicate the vorticity. The particles are transparent, and preferably are less than 50 $\mu$m diameter, and each contains embedded planar crystal mirrors. The particles are suspended in a refractive index matched liquid. Measurement of the particle rotation rate and thus the vorticity of the fluid is preferably accomplished by measuring the rotation rates of reflections of one or more light beams from the planar mirrors. The measurements may be carried out using any system of position sensitive optical detectors such as photo sensitive devices screened by suitable slits or photo diode arrays.

17 Claims, 9 Drawing Figures

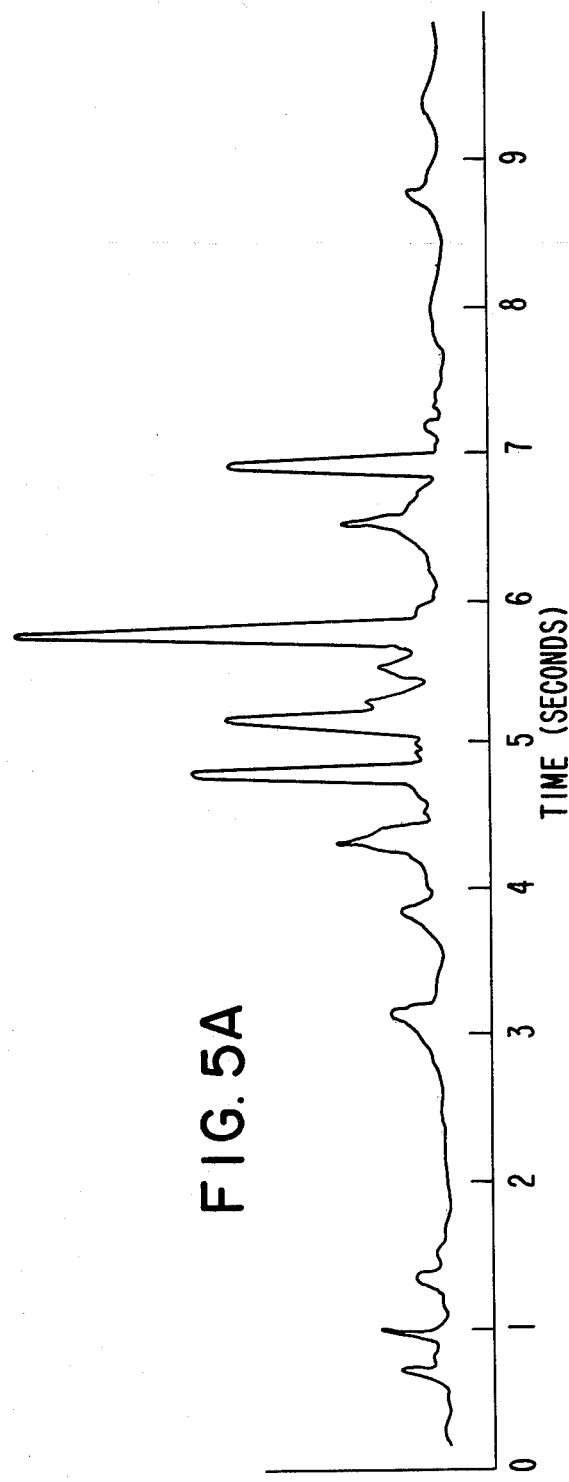
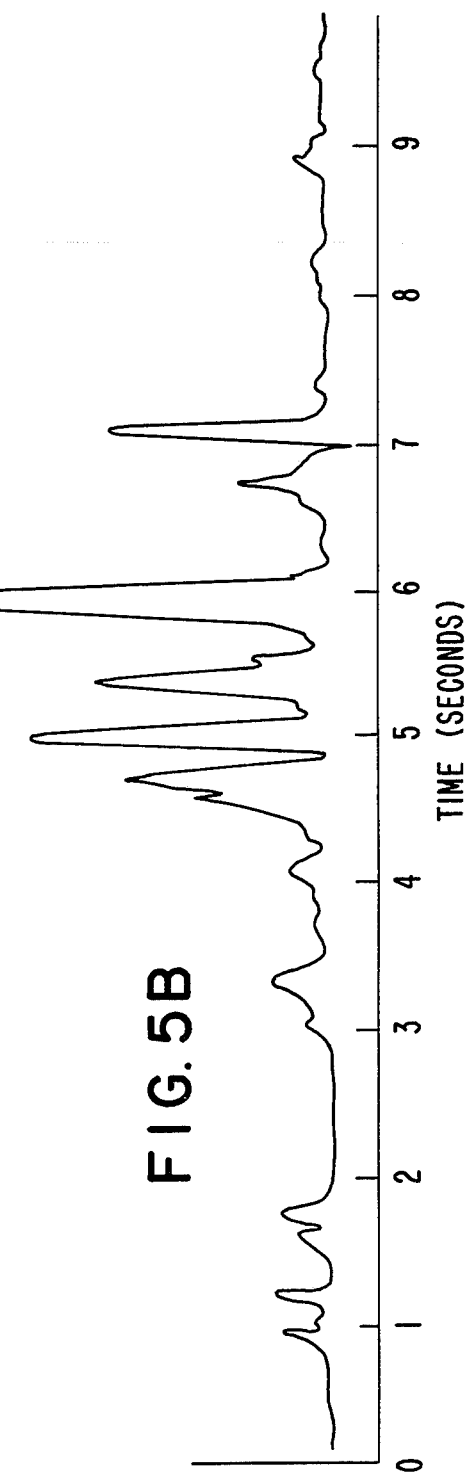
FIG. 5A
FIG. 5B

FIG. 7
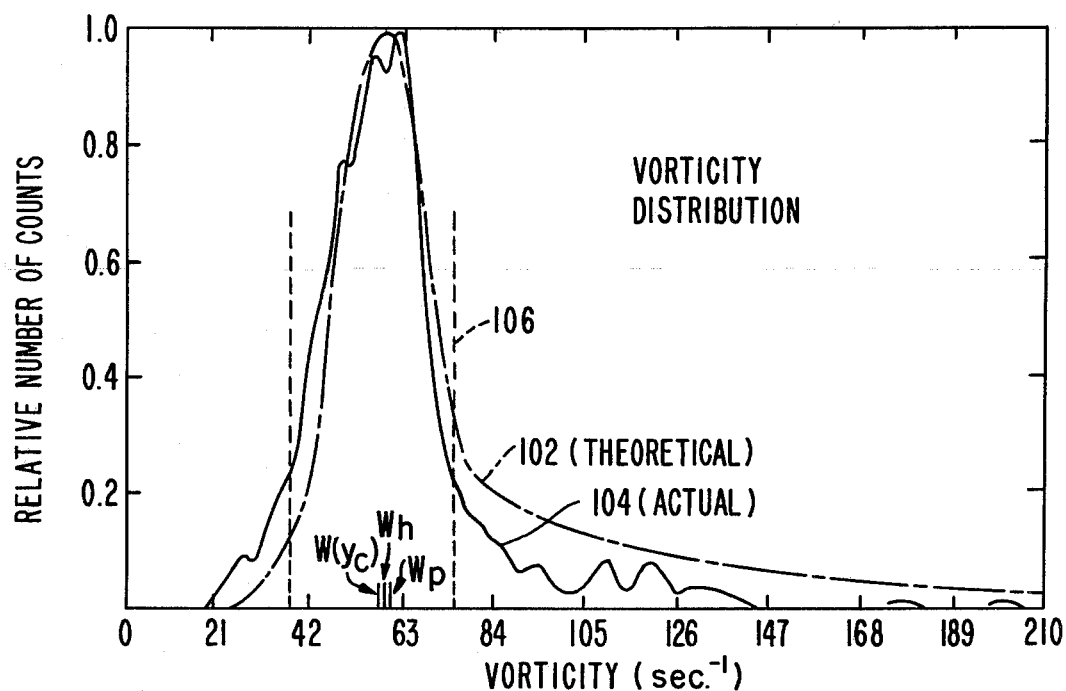
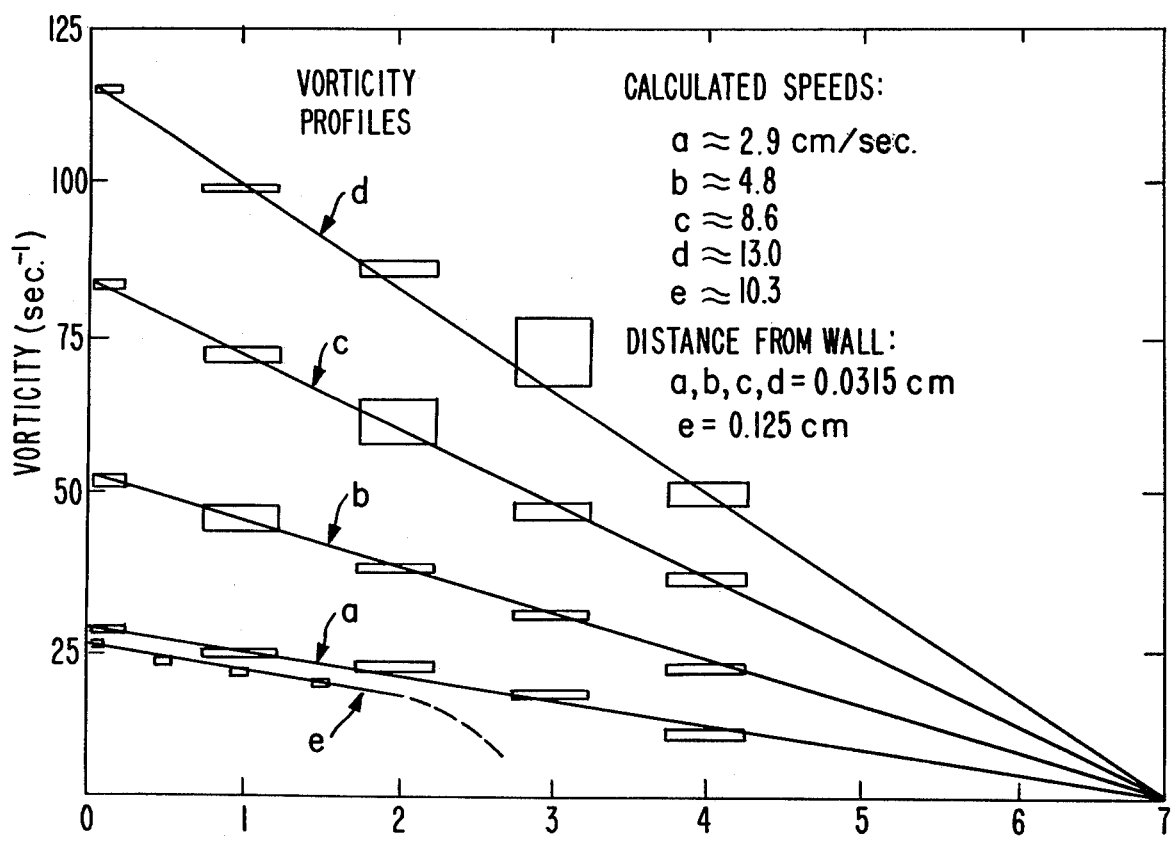
FIG. 8

DIRECT MEASUREMENT OF VORTICITY BY OPTICAL PROBE

BACKGROUND OF THE INVENTION

The present invention relates, in general, to the measurement of vorticity in a flowing fluid, and more particularly to the use of minute reflectors within the liquid which will rotate with the fluid, and optical and circuit means for measuring the rotation of such reflectors.

Although the vorticity field, $\bar{\omega}(\bar{x},t) = \nabla \times \bar{v}(\bar{x},t)$, is an essential property of rotational and tubulent flow, the measurement of vorticity exceeds present experimental capability. Present techniques of hot wire and film anemometry and laser doppler anemometry can measure components of the velocity field $\bar{v}(\bar{x},t)$ at a limited number of points, and the velocity components are ordinarily analyzed by finite differences or by the application of Taylor's frozen flow hypothesis to calculate the vorticity, but error magnification by the necessary differentiations limits the accuracy and spectral range. Spatial resolution has usually been limited to about 0.1 cm by hot probe geometry; recent experimenters have improved the spatial resolution to 100 $\mu$m. In principle, flow perturbations can be avoided and the spatial resolution can be slightly improved by laser doppler anemometry but the complexity of these simultaneous optical measurements has apparently deterred its application to vorticity measurement.

SUMMARY OF THE INVENTION

The ideal system for vorticity measurement should meet these criteria: (a) for the many applications the spatial resolution should exceed the inner scale of turbulence $\eta(\eta \sim 50~\mu\text{m}$ in common liquid flows); (b) temporal resolution should exceed the shortest expected vorticity fluctuation time; and (c) data acquisition rates, spectral range and measurement accuracy should be sufficient for calculation of vorticity correlation functions and higher moments of vorticity.

The potential of such measurements of vorticity has motivated a new approach to this difficult measurement problem, with the result that a new optical system for direct measurement of vorticity distributions in liquids with 50 $\mu$m spatial resolution has now been developed. This system is based on the propensity of small spherical particles suspended in a flowing fluid to accurately track the local vorticity $\omega$ of that fluid by rotation with an angular velocity $\bar{\Omega} = \bar{\omega}/2$. Reflections from a dispersion of small transparent plastic spheres each containing one or more flat, highly reflecting mirrors provide the desired indicator of local vorticity, with a few volume percent of these particles being added to a transparent fluid of matching refractive index. The light beam illuminates a small volume of the flow to be sampled and is reflected by the flat mirrors contained in the rotating particles, causing the beam to scan, or sweep, through an angle. The rotational velocity of each reflected beam, which is proportional to the local vorticity at the reflecting particle, is measured in some embodiments by observing the transit time of the reflected beam across a small angle defined by a pair of aperture plates each containing a narrow slit each such transit provides a datum for prompt on-line calculation of the instantaneous local vorticity, and this calculation is stored for analysis of the vorticity distribution of the fluid. Other embodiments that do not require slits include position photo detectors, photo diode arrays and video camera tubes. This measurement system is herein referred to as a vorticity optical probe.

The fact that small spherical particles will faithfully follow flow fluctuations that occur on a time scale slower than about 1 msec is shown from calculations of the forces which act on small particles of various shapes. These calculations are described by A. Chwang and T. Wu in "Hydro-mechanics of Low-Reynolds-Number Flow. Part 1: Rotation of Axisymmetric Prolate Bodies", published in the *Journal of Fluid Mechanics*, 63, 607, 1974. The calculations are valid when the Reynolds number based on particle radius r and velocity u relative to the surrounding fluid is much less than unity. Stokes' law suggests that relative velocity will relax exponentially with relaxation time $$\tau_u = (2/9) r^2 \rho/\mu \quad (1)$$

where r is the sphere radius, $\rho$ the particle density, and $\mu$ the dynamic viscosity. With appropriate data for the probe particles, $\rho = 1.2$ g/cm$^3$, $\mu = 0.005$ gm/cm-sec and $r = 25 \times 10^{-4}$ cm, the velocity relaxation time is $\rho_\mu \sim 0.4$ msec. Hence, the calculation of Chwang and Wu is valid for the probe particles for time scales $\gtrsim 1$ msec.

Chwang and Wu give the torque on a sphere of radius r rotating at angular velocity $\omega$ relative to the surrounding fluid as $M = -8\pi\mu r^3 \omega$. Thus the rotational relaxation time is $$\tau_r = (1/15) r^2 \pi/\mu. \quad (2)$$

For the probe particles $\tau_r \sim 0.1$ msec.

The shortest time scale in turbulent flow is the Kolmogorov microscale of time $$\tau_k \sim (1/u) R_l^{-1/8} \quad (3)$$

where $R_l$ is the turbulence Reynolds number, l the integral length scale, and u the turbulent velocity. Extreme values in laboratory water tunnel flows are $1 \sim 0.3$ cm, $u \sim 7$ cm/sec, and $R_l \sim 200$ giving $\tau_k = 3$ msec. Therefore the probe particles should readily follow any rotational and translational fluctuations in the turbulent liquid flows to be measured.

This line of analysis also provides an estimate of the possible measurement error due to non-spherical particles that might be formed by damage or adhesion of spherical probe particles. Non-spherical particles do not rotate with the same angular velocity as the fluid, and their long axes tend to align with the principle strain rate in a non-uniform flow. Approximating an adhered pair of spheres by an ellipsoid of major axis 4 r yields a variable rotation rate of the form $$\Omega_p = \frac{4}{5} \cdot \frac{dv/dy}{1 + 3 \sin^2[(2/5)(dv/dy)t]} \quad (4)$$

where dv/dy is the maximum magnitude of the local velocity gradient. The rotation rate $\Omega_p$ of this ellipsoid varies from the rate $\Omega$ for spherical particles within the limited range $$(2/5)\Omega < \Omega_p < (8/5)\Omega \quad (5)$$

Thus, defective probe particles would contribute a broadened background to vorticity measurements.

Rotation of the probe spheres should not be perturbed by inter-particle interaction and they should not perturb the fluid flow. The effective viscosity of the bulk fluid will be increased by a factor of $1 + 2.5\,V$ by the addition of a volume fraction V of solid spherical particles. Thus the probe particle number density n should be limited so that the volume fraction of particles is small; that is, $(4/3)\pi r^3 n < < 1$. For spheres of 25 $\mu$m radius this requires $n < < 1.5 \times 10^7\,cm^{-3}$. A useful concentration, $10^6$ particles/$cm^3$, increases the viscosity by 10% and satisfies the non-interaction requirement.

It has been found that for instances as above described, spherical particles of radius $r < 25\,\mu m$ and moderate density accurately sample the local vorticity, since they rotate at an angular velocity $\Omega$ equal to half the local vorticity $\omega$. Uniform dispersion of the particles requires that they not stick together and that the particle density approximate that of the fluid. To minimize light scattering, the refractive index of the particles must closely match that of the fluid, but to obtain the desired measurements, it is necessary to insure that a large quantity of the particles contain planar mirrors, so that when a laser beam reflects from the surface of such a mirror, it will rotate with an angular velocity signal to the local vorticity $\tilde{\omega}$.

When the fluid vorticity being measured is confined as for example by a channel, the flow to be sampled in the fluid may be subjected to a beam of light from a source of collimated, coherent light such as a laser. Suitable optics such as a prism direct the light beam at an angle of about 45° to the axis of fluid flow, and the incident beam is reflected out of the channel by the planar mirrors. A second prism may be provided on the side of the channel opposite the first prism to cause beams reflected at an angle of 45° from the axis of flow to be directed to a detector. The incident beam and the detector define a detecting plane, and beams reflected from particles which are rotating about axes, substantially perpendicular to the detecting plane scan across a pair of spaced aperture plates in the detector. These aperture plates, each include a slit, and as the reflected beams are scanned, the beams pass first through one slit and then through the other.

In such an instance, Photodetectors are located at each aperture plate slit to detect the passage of the scanning beams, the light falling on one photodetector producing an electrical signal which turns a clock circuit on, and the light falling on the other photodetector producing a signal which turns the clock off, thereby producing a timing signal proportional to the transit time of the beam. This transit time is proportional to the rate of rotation of the particle, and thus to the vorticity of the fluid. The output signal from each photodetector is fed through a threshold detector to clock circuit.

BRIEF DESCRIPTION OF THE DRAWINGS

The foregoing and additional objects, features and advantages of the present invention will become apparent from a consideration of the following detailed description thereof, taken in conjunction with the accompanying drawings, in which:

FIGS. 5A and 5B illustrate the waveforms of typical photodetector output signals;

FIG. 7 is a diagram of a typical vorticity distribution obtained from the system of the invention; and FIG. 8 is a chart illustrating measured vorticity profiles.

DESCRIPTION OF A PREFERRED EMBODIMENT

Figure 1:
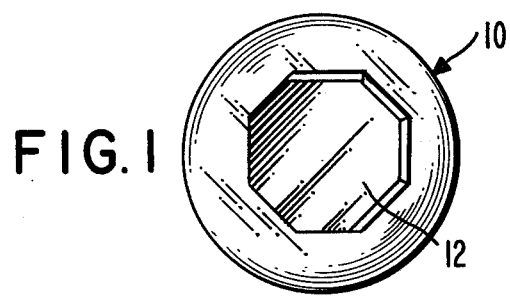
FIG. 1 is a diagrammatic illustration of a particle of the type used in the present invention.

Turning now to a more detailed consideration of an embodiment the present invention, there is illustrated in FIG. 1 a spherical probe particle 10 containing a planar mirror 12. The particle 10 may be made in the following manner. Methylmethacrylate monomer, a volatile, low viscosity liquid, is easily "mass" polymerized, as taught in *Principles of Polymer Systems*, by F. Rodriguez, published by McGraw-Hill, 1970, and in *Experimental Plastics: A Practical Course for Students*, by Redform and Bedford, published by Interscience, 1960, by adding a small amount (0.1% by weight) of initiator (usually benzoyl peroxide) and heating for several hours. A clear, hard plastic solid (commercially known as Lucite or Plexiglass or PMM) results. If the non-water-soluble monomer is suspended in a continuously stirred aqueous solution, it breaks up into small sperical "pearls" 10 and the same chemical polymerization occurs. This procedure is known as suspension or pearl polymerization since the pearls retain their shape when hardened.

For example, one manner of preparing the particles may include a suspension fluid of 2 g/l polyvinyl alcohol (PVA), 1.5 g/l each of sodium chloride (NaCl) and ammonium thiocynate ($NH_4SCN$) in doubly distilled water. PVA prevents the liquid pearls from coalescing once they are separated, NaCl helps to prevent partially polymerized pearls from sticking together, and $NH_4SCN$ inhibits the formation of emulsion polymer (Rodrigues 1970, Hopff et al. 1964). Approximately 150 ml of monomer plus initiator is added to 850 ml of solution, and then whipped or agitated for five seconds in a commercial pulse action blender. The suspension is then poured into a one liter volumetric flask, heated to 65°–70° C. and magnetically stirred on a Corning heater/stirrer for about five hours. The spheres polymerize and, when dried, form about 100 ml of slippery powder.

The lead carbonate "mirrors" 12, shown in FIG. 1, are easily incorporated in the particles before they polymerize by adding 7.5 ml of Mearlmaid Nacromer ZTX-B (supplied by Mearl Co.) to the monomer before whipping. The mirrors are hexagonal euhedral crystal platelets with widths of 8–30 $\mu$m, thickness of 0.07 $\mu$m and refractive index of 2.2. The mirrors generally remain fully enclosed by the plastic spheres throughout the process and do not interfere with the polymerization chemistry.

Figure 2:
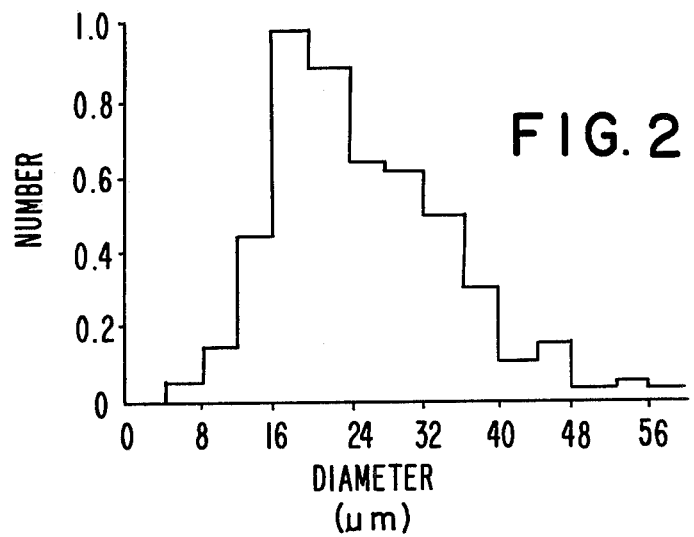
FIG. 2 is a diagram of the particle size distribution of particles used in one of the embodiments of the present invention.

The resulting spheres have a density of about 1.2 g/$cm^3$ and a refractive index of 1.49. Microscopy shows a diameter range of about 5–200 $\mu$m. The smallest spheres contain no mirrors, the larger ones contain several. Since only spheres smaller than a Kolmogorov microscale (see *A First Course in Turbulence*, by H. Tennekes and J. Lumley, MIT Press, 1972) of roughly 50 $\mu$m that contain mirrors are desired, gravitational sedimentation is used to narrow the size range, to obtain particle diameter distribution such that illustrated in FIG. 2, where the average diameter is 21 $\mu$m. On the average, the foregoing process results in about two mirrors per sphere.

To check for flocculation and non-spherical or otherwise defective particles, a microscopic flow system was constructed in which the particles could be observed under actual flow conditions. It was found that a small minimum shear rate, which is easily surpassed in any laboratory flow system, sufficed to keep the spheres dispersed. The observations also show that approximately 3% of the particles have defects such as fractures or non-spherical form. An additional 3-4% appear to be stuck together in inseparable pairs or occasional triplets.

To measure the vorticity in a fluid flow, using these polymethylmethacrylate spheres, the probe particles 10 must be suspended in a fluid having the following properties: (1) a refractive index which nearly matches that of the spheres (1.49) to prevent scattering from their surfaces that would limit the optical depth; (2) no dissolution or chemical reactivity with the particles or components of the flow system; (3) density near that of the particles to prevent rapid settling out; (4) low viscosity to facilitate experiments with high Reynolds number; (5) non-foaming surface properties; (6) low vapor pressure, toxicity and flammability for safety and convenience; and (7) low cost to permit economical large scale apparatus.

Two fluids, dibutyl phthalate and p-cymene, were found which satisfy all or most of the requirements. The former has a viscosity of 0.15 g/m-sec which is suitable for the laminar flow experiments, while the latter has low viscosity, 0.005 g/cm-sec but somewhat higher flammability and vapor pressure. Certain concentrated solutions of salts in water that also satisfy most of these criteria are excessively corrosive.

For the practice of this invention the spheres should be accurately spherical, transparent, contain at least one planar mirror, effectively match the refractive index of the fluid to be studied, satisfy size criteria dictated by the spatial variations of the flow to be studied and preferably have apparent density that matches the fluid density.

Figure 3:
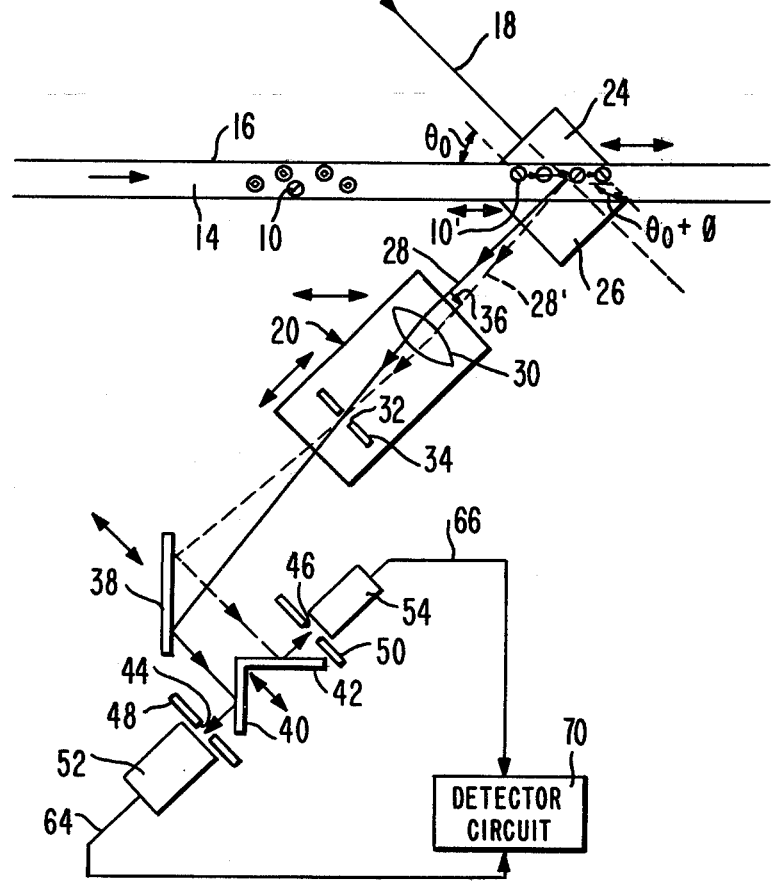
FIG. 3 is a diagrammatic illustration of the optical system used to detect the rotation of particles in one of the embodiments of the invention.
Figure 4:
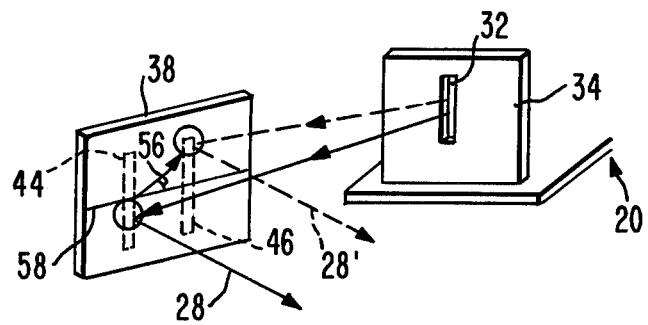
FIG. 4 is a diagrammatic illustration of a detail of FIG. 3.

An optical system for detecting the rotation of probe particles in a fluid flow is illustrated in FIG. 3, wherein the particles 10 are illustrated as being suspended in a fluid 14, the flow being contained in a flow channel 16. The optical system serves to define the sampled volume in the fluid, and to define the particle rotation angle to be timed by the electronic circuitry to be described. The sampled volume is defined by the width of an incident beam of light 18 which illuminates the fluid 14 in channel 16, and by a lens-aperture combination 20 that collects reflections from the mirrors 12.

The light beam 18 is produced by a source such as a laser (not shown) and is directed to the flow channel by way of a movable mirror 22, which permits adjustment of the beam location with respect to the flow channel. The incident beam 18 enters the flow channel 16 at an angle of 45° to the longitudinal axis of the channel through a prism 24 having a refractive index which is matched to that of the channel wall. The light strikes the planar mirrors 12 contained in the particles 10, and is reflected thereby. Because the particles are not uniformly oriented in the fluid, only a small percentage of the planar mirrors reflect light from the incident beam out of the flow channel by way of an exit prism 26. The reflected light 28 leaves the flow channel at an angle of about 45° with respect to the longitudinal axis of channel 16, and thus is approximately perpendicular to the incident beam 18. Any light 28 which is intercepted by collector 20 will pass through a collector lens 30 and through a collector slit 32 formed in a aperture plate 34, and this light may be said to lie in an optical detector plane defined by incident beam 18 and collector 20. It will be understood, however, that since the aperture plate 34 is perpendicular to the detector plane, the collector 20 will intercept reflected light 28 which lies above or below the detector plane, but such light lies substantially in the detector plane.

Th height of slit 32 and the width of beam 18 define the volume of fluid 14 that is sampled, and particles within that volume which are rotating about axes substantially perpendicular to the optical detector plane (which may be considered to be the plane of the drawing of FIG. 3) may reflect light from beam 18 through lens 30 and slit 32. In the test system of the present invention, only about 4% of the total number of reflections were intercepted by the collector 20 in the configuration used, although differently shaped slits and larger light collectors would increase the collection efficiency.

Light passing through slit 32 is reflected by a mirror 38 to one or the other of a pair of movable mirrors 40 or 42 and thence through one or the other of corresponding fixed detector slits 44 or 46 carried in aperture plates 48 or 50, respectively. When light 28 passes through detector slit 44, it falls on a photodetector 52 which produces a corresponding electrical output signal, to be described. Similarly, when light 28' passes through detector slit 46 it falls on a corresponding photodetector 54, which produces a second corresponding electrical signal, also to be described.

It will be seen from FIG. 3 that as a particle 10 enters the sample volume in the flow channel, its mirror surface 12 reflects the incident beam 18. If the particle is properly oriented, the reflected beam will follow path 28 and will be intercepted by the collector 20, will pass through collector slit 32, will be reflected from mirrors 38 and 40, will pass through detector slit 44, and will strike detector 52 to produce a first electric signal. As the particle continues to rotate, the reflected light will scan through an angle 36, thus varying its point of impingement on mirrors 38 and 40. Eventually, the beam 28 will pass from mirror 40 to mirror 42 and when it reaches the location 28', will pass through detector slit 46 and illuminate photodetector 54 to produce a second electrical output signal. The time required for the reflected beam to scan from detector slot 44 to detector slot 46 is proportional to the rate of rotation of the particle.

To characterize the reflections from the probe mirrors, a dummy specimen consisting of particles imbedded in a rigid rod of polymethylmethacrylate was rotated in the illuminating beam at one revolution per minute. FIGS. 5A and 5B are segments of a dual channel chart recorder trace of the signals 60 and 62 appearing at the outputs 64 and 66, respectively, of the two photodetectors 52 and 54 recording these reflections, which signals are processed in the detector circuit 70 to be described. The upper trace is from detector 52 and the lower is from detector 54. Examination of this figure shows that the amplitudes and shapes of pulses from different particles can vary substantially, and frequently the individual pulses comprising a pair differ from each other.

The result of these variations in output is an uncertainty in the measurement time between the pulses detected. This "pulse variation" error can be minimized by maximizing the separation in time of the two pulses relative to their width; that is, by maximizing the rotation angle $\alpha$ of the particle and minimizing the diffraction width $\beta$, or maximizing the ratio $\alpha/\beta$. A narrow pulse width is achieved by the use of a short wavelength of light, for which a He-Cd laser (Liconix Model 401, $\lambda = 4431$ Å) is suitable. The optimum rotation angle of the particle during measurement is difficult to determine because all of the deleterious variations become more pronounced as the rotation angle increases, and disappear at a zero rotation angle. Thus there is a trade-off between maximum time separation and minimum shape variation. In practice, choosing $\alpha/\beta \sim 1$ provides satisfactory results.

Figure 6:
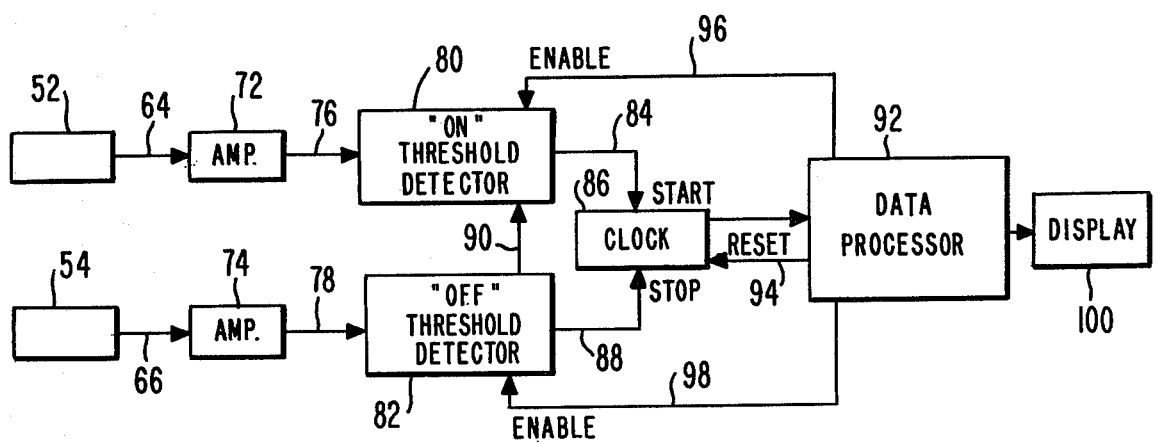
FIG. 6 is a block diagram of the electronic detector circuitry of FIG. 3.

A block diagram of the detector circuit 70 is shown in FIG. 6, to which reference is now made. In this circuit, the outputs 64 and 66 from photodetectors 52 and 54 are fed through respective amplifiers 72 and 74 and lines 76 and 78 to corresponding "on" and "off" threshold detectors 80 and 82. The output signal from photodetector 52 triggers the "on" threshold detector 80 when the pulse reaches a predetermined amplitude to produce a "start" signal on its output line 84. The start signal is applied to a clock circuit 86 to start the clock running.

The output signal from photodetector 54 activates the "off" threshold detector 82 when the applied pulse reaches a predetermined amplitude to produce a "stop" signal on its output line 88, and to also produce a disable signal on line 90 which disable both threshold detectors. The stop signal is applied to clock circuit 86 to stop the clock, and the elapsed time recorded by the clock circuit is supplied to a data processor 92, which then resets the clock 86 and resets the threshold detectors 80 and 82 by way of reset lines 94, 96 and 98, respectively, to enable them for the next reading. The data are converted to vorticity in the computer and displayed on a graphics display terminal 100. Note that measurements of vorticity of only one algebraic sign are recorded with this system as described. Both signs could, however, be simultaneously recorded with more elaborate electronics.

Measurement of the time interval between signals such as those illustrated in FIGS. 5A and 5B is difficult, since the Gaussian shaped pulses may have truncated or very noisy tops. The noise prevents the use of a peak detector as an accurate indicator of the occurrence of an event. The threshold detectors provide more reliable data, but introduce errors if the pulse amplitudes and widths are not constant.

Assume the pulses have Gaussian shape but different width and height, with their peaks separated by a true time $\tau_p$. The pulses are described by the equations:

$$S_1(t) = A_1 \exp\{-t^2/2\sigma_1^2\} \quad (7)$$

$$S_2(t) = A_2 \exp\{(t-\tau_p)^2/2\sigma_2^2\} \quad (8)$$

If the threshold detectors trigger at an amplitude $a_o$ the measured elapsed time is $\tau = t_2 - t_1 + \tau_p + \sigma_1\sqrt{2l} - nA_1 - \sigma_2\sqrt{2lA_1}$. The fractional error is $$\frac{\Delta\tau}{\tau_p} = \frac{\tau - \tau_p}{\tau_p} = \frac{\sigma_1\sqrt{2\ln A_1} - \sigma_2\sqrt{2\ln A_2}}{\tau_p} \quad (9)$$

The error is minimized by maximizing $\tau_p$ and minimizing $\sigma_1$ and $\sigma_2$. If $\sigma_1 \approx \sigma_2$ and $A_1 = CA_2$ where C is a constant, then $\Delta\tau \approx \sigma_2\sqrt{2}$ $(\sqrt{\ln C + \ln A_2} - \sqrt{\ln A_2})$ which approaches zero as $A_2$ increases, suggesting that large pulse amplitudes are also desirable.

The precision and accuracy of vorticity measurement, data acquisition rate, temporal resolution, spatial resolution associated with the fluid volume sample, and the background noise spectrum characterize the vorticity measurement system. These properties are closely interrelated and may be optimized selectively to suit various applications.

A special requirement of the optimization procedure is the selection of conditions that facilitate convenient separation of the measured vorticity spectrum from the characteristic background noise of the system, which is unique in that the noise spectrum depends on the vorticity (signal) spectrum as well as instrumental parameters. Expressions describing the data rate and spatial and temporal resolutions may be derived as follows:

Assume a sampled volume of cross-sectional area A and uniform length s, a mirror concentration n, flow at mean velocity v, and a vorticity vector ($\omega_1$, 0,0). The rate at which mirrors 12 enter and pass through the sampled volume is nAv, of which a small fraction, f, will present the proper vertical orientatrion to reflect light in the direction of slits 44 and 46, which are positioned to measure the X-component of vorticity. Thus the effective mirror passage rate is $R_p = nAvf$. The particles rotate through an angle $\phi = (s/v)\omega_1/2$ while they transit the sampled volume (see FIG. 3). Those that rotate through an additional angle $2\alpha$ (illustrated as angle 36 in FIG. 3) before leaving the sampled volume can generate vorticity data.

The temporal resolution associated with an individual datum is the time for rotation through $2\beta$, that is $\tau_1 4\alpha/\omega_1$. Ideally $\alpha \to 0$ would yield instantaneous data. In this limit the probability of a mirror entering the sampled volume with an initial azimuth suitable for data production is $\phi/\rho$, yielding an ideal limiting data rate $R_i = R_p\phi/\rho$, or $$R_i = fnAs\omega_1/2\pi = fN\omega_1/2\pi \quad (10)$$

where N is the average number of mirrors within the sampled volume. $R_i$ is also the limiting data rate generated by a mirror density n as the flow velocity vanishes, or $\phi \to \infty$. The mirrors rotate at a frequency $\omega_1/4\tau$ with a fraction f oriented to product two data per rotation, due to the twofold symmetry of the mirrors.

To measure a rotation time the detector slits 44 and 46 must be separaterd, hence $\alpha$ is necessarily non-zero. Consequently at non-zero flow velocity, some mirrors enter the sampled volume with an azimuth which will not allow data generating during their residence time. A mirror may then generate pulses which either trigger the on detector 80 and the off detector 82 in sequence, producing a 'valid' datum, trigger only one detector, or trigger no detector before leaving the sampled volume. Mirrors having an initial azimuth suitable for valid data production are detected at a rate $$\begin{aligned} R_a &= fnAv(\phi - 2\alpha)/\pi & (\phi - 2\alpha) > 0 \\ R_a &= 0 & (\phi - 2\alpha) > 0 \end{aligned} \quad (11)$$

The rate at which the individual detectors are triggered, however, remains equal to $R_i$, independent of $\alpha$ and v. The difference, $R_r = R_i - R_a$, defines the rate at which pulses appear in each detection channel that have no correlated pulses (those due to the same reflection) in the other channel. These "random" pulses result in a further reduction of the measured data rate by occasionally appearing between the two correlated or 'valid' pulses comprising the "valid on-off pair" required to generate a valid datum. Random pulses occuring sequentially in the two channels may also product 'false' data values, resulting in 'background noise'.

The measured valid data rate, $R_m$, is determined by enumeration of the possible sequences of events involving valid and random pulses. Five such sequences can occur:

(1) A valid on-off pair is uninterrupted and produces a valid datum.
(2) A valid pulse starts the clock 86 and a random pulse stops it, generating noise.
(3) A random pulse starts the clock 86 and a valid off pulse stops it, generating noise and disqualifying the valid pair from data production.
(4) Random pulses both start and stop the clock, generating noise.
(5) Two (or more) valid on-off pairs overlap, disqualifying the second pair from data production.

Sequences 2, 3, and 5 limit the measured data rate to some value less than $R_a$. In addition, sequences 2, 3 and 4 generate invalid elapsed time measurements, thus creating a spectrum of false vorticity noise.

The measured data rate then is $$R_m = R_a - R_2 - R_3 - R_5 \quad (12)$$

where $R_j$ are the rates at which the enumerated sequences $j=2,3,5$ occur. These rates may be calculated as follows.

Recall that pulses presented to the off detector 82 before the clock has been started pass undetected. Similarly, pulses presented to the on detector 80 which the clock is running also pass undetected.

To suppress low vorticity noise, the system automatically resets after a predetermined elapsed time if no pulse is presented to the off detector 82.

Consider those sequences wherein random pulses presented to the on detector 80 with rate $R_r$ start the clock, and random or valid pulses presented to the off detector 82 at rate $R_i$ stop it. The rate $R_f$ of occurence of false data generating pulse pairs in this case is the rate of random pulse presentations to the on detector, $R_r$, multiplied by the probability of detection of these pulses, $1/(1+R_r/R_i)$, or $$R_f = R_r R R_i/(R_i+R_r) \quad (13)$$

This case can be divided into two sub-cases where the off detector is triggered by a valid pulse, or it is triggered by a random pulse. The first has a probability $R_a/R_i$ of occurence, and the second has probability $R_r/R_i$. Hence, the rate of random ons-valid offs (sequence 3) is $$R_3 = (R_a/R_i)R_f = R_r R_a/(R_r+R_i) \quad (14)$$

and the rate of random ons-random offs (sequence 4) is $$R_4 = R_r^2/(R_r+R_i) \quad (15)$$

Random events occuring at an average rate R describe a Poisson process. Thus, starting at an on detection, the normalized probability density of elapsed times until a random off detection is $$P(R,t) = R \exp(-Rt) \quad (16)$$

where the off detections occur at rate R. For the cases considered above the off rate is, from Eq. 10, $R_1$, so $R=R_1$. The resulting elapsed time distribution, weighted by the false data rate is $D(t) = R_f P(R_1,t)$.

Now consider sequence 2 where a valid pulse pair starts the clock and a random pulse stops it. There is an additional restriction; the random pulses must occur in the time intrval $[0, 4\alpha/\omega_1]$. thus the probability of this sequence occuring is $$P_2 = \int_0^{4\alpha/\omega_1} P(R_r,t)dt = 1 - \exp(-4\alpha R_r/\omega_1) \quad (17)$$

Since valid pulse pairs occur at rate $R_a$, the rate at which this source of false data is generated is $$R_2 = R_a P_2 = R_a[1 - \exp(-4\alpha R_r/\omega_1)] \quad (18)$$

Finally, the probability of two valid pulse pairs overlapping (sequence 5) is $$P_5 = \int_0^{4\alpha/\omega_1} P(R_a,t)dt \quad (19)$$

and the rate at which data is lost to this sequence of events is $$R_5 = R_a P_5 = R_a[1 - \exp(-4\alpha R_a/\omega_1)] \quad (20)$$

Inserting these results in the equation for $R_m$ above, the measured data rate becomes $$R_m = R_a[\exp(-4\alpha R_r/\omega_1) + \exp(-4\alpha R_a/\omega_1) - (2R_r R_i)/(R_r+R_1)] \quad (21)$$

Sequence 2, 3, and 4 above yield continuous distributions of values of the elapsed time. Since these are all Poisson processes, the probability density of elapsed times is directly calculable. Weighting the probability densities with the corresponding noise generation rates yields the total elapsed time noise distribution:

$$D_n(t_n) = [R_r R_i^2/(R_r+R_i)]\exp(-R_i t_n) + \begin{cases} R_a R_r \exp(-R_r t_n) : t_n < 4\alpha/\omega_1 \\ 0 : t_n > 4\alpha/\omega_1 \end{cases} \quad (22)$$

The first term is generated by sequences 3 and 4, and the second term is generated by sequence 2. The distribution determines a fictitious vorticity distribution, or vorticity noise spectrum conveniently written as $$B_n(\omega_n) = [4\alpha(R_i - R_a)/\omega_n^2] [\exp(-4\alpha R_i/\omega_n)] \left[ R_i^2/(2R_i - R_a) + \begin{cases} R_a \exp(4\alpha R_a/\omega_n): \omega_n > \omega_1 \\ \\ 0: \omega_n < \omega_1 \end{cases} \right] \quad (23)$$

This distribution has a sharp peak at $\omega_n$(peak)$=2\alpha R_i$, and a long tail towards high values of vorticity. The total noise data rate is $$R_n = (R_i^2 + R_i R_a - R_a^2)/(2R_i - R_a) - R_a \exp[4\alpha(R_i - R_a)/\omega_1] \quad (24)$$

The measured data rate given by Eq. 21 is implicitly a function of all experimental parameters, $R_m = R_m(f, N, \alpha, s, v, \omega_1)$. The present system is optimized by maximizing the data rate for a particular experimental vorticity value and spatial resolution. The spatial resolution $s^{-1}$ is limited by the requirement that the mirrors 12 have sufficient residence time in the sampled volume to rotate through the angle $2\alpha$ before translating out of the sampled volume, that is, $R_a \geq 0$, or by Eq. 11

$$\omega_1/v \geq 4\alpha/s \quad (25)$$

The data is limited by overlapping pulse pairs if the flow velocity is small, and by the requirement that the true vorticity peak be easily distinguished from the noise spectrum if operating near the vorticity/velocity threshold limit given by Eq. 25. Since both the data rate and the noise spectrum depend on the number of mirrors within the sampled volume, optimization generally imposes a condition on N. Examination of the foregoing equations in the limits $v \to 0$ and $\omega_1/v \to 4\alpha/s$ illustrate these limitations.

Since $R_r \to 0$ and $R_a \to R_i$ as $v \to 0$ Eq. 21 shows that $$\lim_{v \to 0} R_m = R_i \exp(-4 R_i/\omega_1) \quad (26)$$

This data measurement rate peaks at $R_1 = \omega_1/4\alpha$, resulting in a maximum possible data rate of $$R_m(\text{max}) = \omega_1/4e\alpha = \omega_1/10.87\alpha \quad (27)$$

Optimization of the number of mirrors in the sampled volume for this data rate requires, from Eq. 10

$$N_{opt} = \pi/2f e\alpha = 0.58/f\alpha \quad (28)$$

Either more or fewer mirrors in the sampled voluem will reduce the data rate.

In the vorticity measurement threshold limit, $\omega_1/v \to 4\alpha/s$, the valid pulse pair rate $R_a \to 0$ and $R_n \to R_i$, so that all of the pulses eventually become random, and the vorticity peak vanishes into the noise background. Appropriate approximations of Esq. 21 and 23 provide an analysis of the approach to this limit.

The background noise spectrum at $\omega_m = \omega_1$ here becomes
$$B_n(\omega_1) \approx 2R_i^2/\omega_1^2 = (\alpha/2)(fN/\pi)^2 \quad (29)$$

where the assumption $2fN\alpha/\pi << 1$ has been invoked to approximate the exponential in Eq. 23 by unity. Eq. 21 becomes, approximately $$R_m \approx (fN/2\pi)(\omega_1 2 - 2\alpha v/s) \quad (30)$$

Assuming that the valid data peak at $\omega_1$ is actually spread over a width $\delta\omega$, the spectral density of the valid data is $R_m/E\omega$ so that a "signal to noise" ratio can be defined as $$r_n = (R_m/\delta\omega)/B_n(\omega_1) = (\omega_1/2 - 2\alpha v/s)/\alpha fN\delta\omega \quad (31)$$

Selection of a signal to noise ratio $r_n$ as large as desired specifies a maximum value of N, $$N \leq \pi(\omega_1/2 - 2\alpha v/s)\alpha f r_n \delta\omega \quad (32)$$

With the maximum value of N, the noise peak occurs at $$\omega_n(\text{peak}) = 2\alpha R_i = \omega_1(\omega_1/2 - 2\alpha v/s)/r_n \delta\omega \quad (33)$$

If $\omega_1/\delta\omega << 1$ then $\omega_n(\text{peak}) << \simeq$, and the false peak is clearly separated from the real peak, as desired.

The entire discussion of data rate and noise has, to this point, assumed a single value (or narrow range) of the vorticity vector, enabling this comprehensive illustration of optimization. However, a realistic flow field will have a distribution of measurable vorticity values, and perhaps vorticity vectors oriented in a direction opposite to that which is under observation. In such situations the values of $R_i$ and $R_a$ are still proportional to the mirror density n, but quantitative analysis becomes excessively tedious. However, the preceding discussion suggests that the true vorticity spectrum can always be separated from the noise spectrum by reducing the particle concentration until the peak of the noise spectrum is located at a value of vorticity which is much less than the threshold value of measurable vorticity, $\omega_{min}$, for the particular flow situation. This peak is easily recognized but it can be suppressed by automatically resetting the detectors after a time interval $t_r$ so that $4\alpha/\omega_{min} << t_r << 1/R_i$ allows a slight increase in the measured data rate, and a considerable improvement in the appearance of the vorticity distribution by suppressing the low vorticity noise.

Vorticity measurement uncertainties limit the vorticity resolution of the present system and broaden measurements of vorticity distribution. Limitations of optical geometry and imperfection of the probe particle reflections introduce small errors in all reflection transit time measurements and thus in vorticity measurements, whatever the flow system. In addition finite spartial resolution in the presence of a macroscopic spatial vorticity gradient broadens the vorticity distribution.

EXAMPLE

In a test of a system constructed in accordance with the invention, a Plexiglass channel, 5.1 cm high, 1.3 cm wide, and 50 cm long was constructed. An extra piece of Plexiglass, 5.1 cm high and 25 cm long, can be inserted to reduce the channel width to a nominal 0.4 cm. A gravity fed, recirculating pump system was provided to drive the fluid, dibutyl phthalate, through the free-surfaced channel. Screens placed in the entrance region smoothed out gross flow irregularities. Flow velocity maxima were determined by measuring the transit times of visible particles between fiducial marks. The flow system included provisions to vary all of the parameters entering into the resolution of measurement uncertainties, to facilitate its use for testing and calibrating the system and determining its vorticity resolutions. A cylindrical lens placed in the path of the incident beam may be used to change the otherwise cylindrical sampled volume into a rectangular parallelepiped.

Flow visualization was used to determine the areas within the channel where the flow was sufficiently well developed for good measurements. Suspended Guanine platelets (Kalliroscope Corp. product AQ-1000) were aligned by the flow in the direction of the maximum shear rate, making boundary layers and flow inhomogeneities clearly visible. The velocity and vorticity profiles became fully developed slightly downstream of the point at which the boundry layers from either side of the channel met. In the 0.4 cm wide channel, observations showed that this occurred at positions at least 20 cm downstream of the entrance. In the 1.3 cm wide channel it was not clear that the Poiseulle flow developed fully for celocities above 3 cm/sec. Effects of the bottom of the channel appeared to be nigligible above 2.5 cm. Velocities at the center of the channel ranged from about 1 to 15 cm/sec.

FIG. 7 compares a calculated vorticity distribution curve 102 with the corresponding measured distribution curve 104 using the same flow parameters in the narrow channel. The agreement is quite good, especially near the half-maximum points. A silimar comparison of some wide channel data taken near the channel wall showed that the wide channel had a shallower vorticity gradient than the narrow channel, with a correspondingly narrower sampling function as expected. It also showed a smaller vorticity/velocity ratio, which was responsible for the increased experimental tail amplitude and the small noise peak at low vorticity values. The automatic reset circuit is responsible for the sharp cut-off at the low end of the experimental distribution. The experimental wide channel data showed a curious secondary peak, centered at approximately twice the value of the primary peak, which appeared only in observations close to the wall. It may have been the result of some sort of flow fluctuations. The Reynolds number ($v_o w/\nu$) for this flow is about 100.

A numerical device which is useful to compare different vorticity distributions is demonstrated by the rectangle 106 drawn in FIG. 7. The width and position of the rectangular construction are determined to yield the second and third moments of the experimental distribution around its average. The bottom 10% of the distribution is ignored in calculating the moments to eliminate the contributions of the various errors.

Several sets of vorticity measurements are plotted as functions of measurement position $y_c$ in FIG. 8. They show, within error limits, the anticipated linear vorticity profiles for these Poiseulle flows. Each vorticity point is plotted as a rectangle with a width representative of the positional uncertainty and a height equal to the difference between two measures of vorticity, namely the peak vorticity $\omega_p$ and the average of the half-maxima $\omega_h$. The vorticity values $\omega_p$ and $\omega_h$ should very nearly coincide with the vorticity at the center of the sampled volume, $\omega(y_c)$. The experimental values of $\omega_h$ are repeatable to within a few percent and are thus good measures of $\omega(y_3)$. The rms value of the differences $\omega_p - \omega_h$ provide a practical measure of the uncertainties of vorticity measurements. For these data the relative uncertainty of vorticity is about 8%.

The velocities indicated in FIG. 8 are calculated from the slopes of the straight lines determined by the vorticity measurements, since this measure is more precise than the flow velocity estimates. The calculated velocities do agree with the approximate measured velocities.

In the wide channel the flow had not reached a fully developed Poiseulle parabolic velocity profile. Boundary layer theory shows that the boundary layer 20 cm downstream from the edge of a flat plate will have a width of about 0.5 cm when the flow velocity is 10 cm/sec and kinematic viscosity is 0.15 cm$^2$/sec. Thus there should be a high vorticity boundary layer with small vorticity gradient near the wall that drops rapidly to zero near the edge of the boundary layer. The wide channel vorticity profile, line 'e' in FIG. 8 appears to have a fully developed flow profile near the wall for a channel width of 1.6 cm at the correct center line velocity of 10.3 cm/sec. However, the actual channel width is only 1.3 cm and the vorticity drops sharply below the detectable minimum beyond 0.25 cm from the wall. These results are consistent with the above calculations and with the flow visualization observations that a distinct boundary layer remains.

Poiseulle flow allows a very simple comparison to be made between the expected vorticity resolution and the actual width of the distribution. If a width, $\Delta y$, of the vorticity profile is uniformly sampled (s=constant), then the corresponding width $\Delta y$, of the vorticity profile is uniformly sampled (s=constant), then the corresponding width $\Delta \omega$ of the vorticity distribution is $$\Delta \omega = (2v_o/w^2) \Delta y.$$

In the present experiment the foregoing equation should provide a reasonable approximation even though s varies.

In summary, a system for vorticity measurement by means of a direct optical probe has been described and tested under the stringent conditions imposed by laminar flows. The accuracy, vorticity resolution, data rate and spatial resolution of the system and the experimental parameters on which these properties depend have been analyzed and demonstrated by actual measurements.

There are some fundamental interdependent limits on the system capabilities. The drift velocity/vorticity ratio sets a lower limit on the spatial resolution, $s_{min} = 4\alpha v/\omega$, since the residence of a probe particle within the sampled volume must exceed the vorticity detection time. An upper limit on the number of particles within the sampled volume with zero flow velocity, $N_{opt} = 0.58/f\alpha$, is determined by maximizing the data rate while requiring that reflections from multiple particles have a small probability of overlapping. The factor f represents the geometrical data collection efficiency, which may be improved by more elaborate optical design. The maximum data acquisition rate, $R_m(\max) = \omega/10.87\alpha$ is achieved in a zero flow velocity situation if the number density is determined $N_{opt}$. As the flow velocity increases from zero the maximum data rate decreases and background noise increases. The signal to noise rate, $r_n \approx \pi(\omega/2 - 2\alpha v/s)/\alpha f N \delta \omega$ can be made as large as desired for any value of vorticity greater than the limiting value of $\omega = 4\alpha v/s$ by selecting a sufficiently smaller mirror number density, thus separating the valid data from the background.

The discussion of the background noise reveals one noteworthy point. As $\alpha \rightarrow 0$ all noise disappears, the particle number density is limited only by the size of the spherical probe particles, and the data rate is bounded by only this density limit. In the present system $\alpha$ must be non-zero to deal with variations of the size and shape of the reflections. The rotation angle $2\alpha$ is coupled to the divergence angle of the micromirror reflections by the requirement $\alpha/\beta \geq 1$. However, if particles with completely uniform mirrors, preferably perfect disks, could be produced, and if the illuminating beam were converted from a gaussian to a "top hat" intensity profile, the vorticity could be determined by measuring the width of a single pulse peak as it transits a slit. The minimum value of $\alpha$ could then be determined by the temporal resolution of the electronics, and would be very close to zero. Since the vorticity resolution, discussed at length in Section III is also coupled to the optical parameters, the illuminating beam intensity profile, and the particle uniformity, it would also be substantially improved by better particles.

The small spherical particles used in the invention are dispersed in the fluid, and their rotation is observed. This rotation follows the local vorticity on a time scale better than 1 msec. To be able to observe the rotation, individual optically flat crystalline mirrors are trapped in each particle. The particles are dispersed in a fluid which has substantially the same refractive index as the particles, and the fluid and the particles are illuminated by a light beam. The rotation rates of the reflections from the mirrors are determined by measuring the time delay between signals from a closely spaced pair of detectors. These measurements are accumulated in a data processor such as a microprocessor, and the vorticity spectra and correlations of interest are analyzed on-line by the processor. Various higher correlations are accessible by subsequent calculations and multiple measurement locations along or around a flow channel. Each reflected beam thus provides an accurate measurement of vorticity component.

Although the invention has been described in terms of preferred embodiment, it will be apparent to those of skill in the art that numerous variations and modifications can be made. Thus, for example, the transparent probe particles can be made from any polymerizable monomer or mixture of monomers wherein the resulting polymer will exhibit the desired optical properties and characteristics, as described above. Similarly, the polymerization technique described is not critical, and any technique may be used as long as it produces particles having the described optical properties, and as long as the technique is compatible with the provision of planar mirror surfaces in the particles. Although specific mirror surfaces are described, it will be apparent that other materials may be used, as long as they are capable of providing the probe particle optical characteristics herein described. In addition, the particular fluid used is not critical, as long as it has the properties and produces the functions herein described. Accordingly, it is desired that the true spirit and scope of the invention be limited only as set in the following claims.

We claim:

1. An optical system for the direct measurement of vorticity in a fluid, comprising;

channel means defining a flow path;

an optically clear liquid flowing in said channel;

a plurality of transparent, spherical probe particles carrying planar mirrors, said probe particles having a refractive index and a density approximating that of said liquid and having a size sufficiently small to permit rotation with the vorticity of the said liquid, said particles being suspended in said liquid at a concentration sufficiently low to prevent interparticle interaction and perterbation of the liquid flow, while having a concentration and size sufficiently great to accurately sample the vorticity of said liquid;

a source of light;

means for directing an incident beam of said light into said liquid, said incident beam of light striking and being reflected by said planar mirrors carried by said probe particles;

a detector plane common to said incident beam;

a first aperture plate having a first aperture slit, said first aperture plate being substantially perpendicular to and passing through said detector plane;

means for imaging reflected light beams onto said first aperture plate, said reflected beams lying substantially in said detector plane and being scanned across said aperture plate by the rotation of properly oriented probe particles, the rotation of said probe particles causing the portion of said reflected beams which passes through said first aperture slit to scan through a first angle;

detector means for receiving light passing through said first aperture slit, said detector means including second and third spaced aperture plates having corresponding second and third aperture slits whereby the light from said first slit scans sequentially from said second aperture slit to said third aperture slit as said light beam scans through said first angle; and circuit means for measuring the time required to scan said light beam from said first aperture plate to said second aperture plate, said circuit means including first and second photodetectors aligned with the apertures of said second and third aperture slits, respectively, first and second threshold detectors responsive to the outputs of said first and second photodetectors, respectively, and clock circuit means for measuring the elapsed time between actuation of said first and second threshold detectors by their respective photodectors in response to said light beam, said elapsed time being proportional to the rate of rotation of said probe particles and thus to the vorticity of said liquid.

2. The vorticity measurement system of claim 1, wherein said first threshold detector responds to an output from said first photodetector to start said clock circuit, and said second threshold detector responds to an output from said second photodetector to stop said clock circuit, whereby said elapsed time is measured.

3. The vorticity measurement system of claim 2, further including means for accumulating successive elapsed time measurements, whereby an accurate measurement of vorticity is obtained based on the measured rotation of successive particles in said fluid.

4. The vorticity measurement system of claim 1, wherein said particles are formed by suspension polymerization of methylmethacrylate.

5. The vorticity measurement system of claim 1, wherein said planar mirrors are particulte platelets embedded in said spherical probe particles.

6. The vorticity measurement system of claim 1, wherein said means for directing an incident beam of light into said liquid comprises a first transparent wall on said channel means, and a first prism mounted on and having a refractive index approximating that of said first transparent wall.

7. The vorticity measurement system of claim 6, wherein said means for imaging reflected light beams onto said first aperture plate comprises a second transparent wall on said channel means, and a second prism mounted on said second wall, whereby said reflected beams are imaged without a magnification on said first aperture plate.

8. The vorticity measurement system of claim 7, wherein said means for imaging further includes lens means between said prism and said aperture plate.

9. The vorticity measurement system of claim 8, wherein the height of said first aperture slit and the width of said incident beam define the sample volume of said fluid to be measured, whereby properly oriented particles moving through said sample volume direct reflected beams through said first aperture slit.

10. The vorticity measurement system of claim 9, wherein said properly oriented probe particles have axes of rotation substantially perpendicular to said detector plane.

11. The vorticity measurement system of claim 10, wherein said detector means further includes reflector means for directing light from said first aperture slit to one or the other of said second and third aperture slits.

12. The vorticity measurement system of claim 11, wherein said first threshold detector responds to an output from said first photodetector to start said clock circuit, and said second threshold detector responds to an output from said second photodetector to stop said clock circuit, whereby said elapsed time is measured.

13. The vorticity measurement system of claim 12, further including means for accumulating successive elapsed time measurements and for converting said measurements to corresponding vorticity measurements.

14. The vorticity measurement system of claim 13, wherein said means for accumulating further includes means for resetting said threshold detectors after each measurement of elapsed time, and for resetting said first threshold detector after a predetermined time in the absence of an output from said second photodetector which activates said second threshold detector.

15. The vorticity measurement system of claim 14, wherein said source of light is a laser.

16. A system for measuring the vorticity of a fluid, the combination which comprises:
an optically clear fluid flowing in a channel;
a plurality of transparent, spherical probe particles of polymethylmethacrylate having a refractive index and a density approximating that of said fluid and having a size sufficiently small to permit rotation with the vorticity of said fluid, said probe particles containing planar mirrors consisting of lead carbonate euhedral crystals;
means for illuminating said planar mirrors;
means for detecting light reflected from said planar mirrors; and
means for measuring the angular velocity of the reflected light to determine the vorticity of said fluid.

17. A method of making transparent particles for use in vorticity measurement of fluids, comprising:
suspending small particles in an aqueous solution;
adding small euhedral lead carbonate crystal platelets to said monomer;
intensly agitating said suspended monomer; and
subsequently polymerizing said small particles to produce spherical, transparent particles, said particles fully enclosing said crystal platelets to form enclosed reflective planar mirrors.

* * * * *

UNITED STATES PATENT AND TRADEMARK OFFICE
CERTIFICATE OF CORRECTION

PATENT NO. : 4385830

DATED : Issued May 31, 1983

INVENTOR(S) : Watt W. Webb et al

It is certified that error appears in the above-identified patent and that said Letters Patent is hereby corrected as shown below:

Col. 1, between lines 5 and 6, insert --The United States Government may have certain rights in this invention under National Science Foundation Grant no. DMR 77-0031.--

Col. 1, line 63, change "slit each" to --slit. Each--.

Col. 2, line 35, change "$R_\ell^{-178}($" to --$R_\ell^{-\frac{1}{2}}$ --;

line 51, change "4 r" to --4r--;

line 58, change "ρ" to --p--

Col. 3, line 22, change "$\sim_\omega$" to --$\omega$--;

line 41, change "Photodetectors" to --photodetectors-- line 48, after "is" insert --inversely--.

Col. 4, line 40, change "Rodirigues" to --Rodriguez--.

Col. 6, line 52, after "is" insert --inversely--.

Col. 7, line 63, change "$\sqrt{21A_1}$" to --$\sqrt{2\ell\eta A_2}$ --.

Col. 8, line 32, change "an additional" to --the--;

line 36, change "2β" to --2α--;

line 37, change "$\tau_1 4\alpha/\omega_1$" to --$\tau_1 = 4\alpha/\omega_1$--;

line 40, change "$\phi/\rho$" to --$\phi/2\pi$ --;

line 41, change "$R_p\phi/\rho$" to --$2R_p\phi/2\pi$ --;

line 48, change "$\omega_1/4\tau$" to --$\omega_1/4\pi$ --;

line 64, change "$(\phi-2\alpha)>0$" to --$(\phi-2\alpha)<0$--;

UNITED STATES PATENT AND TRADEMARK OFFICE
CERTIFICATE OF CORRECTION

PATENT NO. : 4385830
DATED : Issued May 31, 1983
INVENTOR(S) : Watt W. Webb et al It is certified that error appears in the above-identified patent and that said Letters Patent is hereby corrected as shown below:

Col. 9, line 35, change "$R_{5tm}(12)$" to --$R_5$ (12)--;
line 42, change "which" to --while--;
line 58, change "$R_f = R_r R R_i /(R_i + R_r)$" to --$R_f = R_r R_i /(R_i + R_r)$--.

Col. 10 line 15, change "$R_1$" to --$R_i$--;
line 16, change "$R_1^1$" to --$R_i^i$--.

line 17, change "$R_f P(R_1, t)$" to --$R_f P(R_i, t)$--;

line 22, change "intrval" to --interval--;
line 22, change ".thus" to --.Thus--;

line 49, change equation (21) to read --$R_m = R_a [\exp$ $(-4\alpha R_r/\omega_1 + \exp(-4\alpha R_a/\omega_1) - (2R_r + R_i)/(R_r + R_i)]$--

Col. 11 line 28, after "data" insert --rate--;
line 40, change "$(-4R_i/\omega_1)$" to --$(-4\alpha R_i/\omega_1)$--;

line 43, change "$R_1 =$" to --$R_i =$--;

line 52, change voluem" to --volume--;
line 58, change "Esq." to --Eqs.--;
line 60, change "$\omega_m$" to --$\omega_n$--;

line 62, change "$2R_i^2/\omega_1^2$" to --$2\alpha R_i^2/\omega_1^2$--;

line 68, change "$\omega_1^2$" to --$\omega_1/2$.--

UNITED STATES PATENT AND TRADEMARK OFFICE
CERTIFICATE OF CORRECTION

PATENT NO. : 4385830

DATED : Issued May 31, 1983

INVENTOR(S) : Watt W. Webb et al

Page 3 of 3

It is certified that error appears in the above-identified patent and that said Letters Patent is hereby corrected as shown below:

Col. 12, line 12, change "$R_m/E\omega$" to --$R_m/\delta\omega$--;

line 14, change "$=(\omega_1/2$" to --$=\pi(\omega_1/2$--;

line 19, change "v/s)αf" to --v/s)/α f--;

line 25, change "(peak)<<≅" to --(peak)<<$\omega_1$-- line 44, after "$t_r$" insert --has elapsed after an on pulse without an off pulse. Choosing $t_r$--;

line 55 change "spartial" to --spatial--.

Col.13, line 23, change "celocities" to --velocities--;
line 24, change "nigligible" to --negligible--.

line 67, change "$\omega(y_3)$" to --$\omega(y_c)$--.

Col. 15, line 17, cancel ",dis-"
line 18, cancel "cussed at length in Section III".

Signed and Sealed this

Thirteenth Day of November 1984

[SEAL]

Attest:

GERALD J. MOSSINGHOFF

Attesting Officer

Commissioner of Patents and Trademarks